United States Patent [19]

Ridding

[11] 3,742,910
[45] July 3, 1973

[54] GATE FOR ANIMAL ENCLOSURE
[75] Inventor: Michael John Ridding, Battle, England
[73] Assignee: Alfa-Laval AB, Tumba, Sweden
[22] Filed: Jan. 3, 1972
[21] Appl. No.: 214,766

[52] U.S. Cl. ............................................. 199/27
[51] Int. Cl. ...................................... A 01K 1/00
[58] Field of Search .................. 119/27, 96, 98, 99, 119/155; 49/385

[56] References Cited
UNITED STATES PATENTS

| 69,022 | 9/1867 | Putnam | 119/27 |
|---|---|---|---|
| 516,466 | 3/1894 | Blackburn | 119/27 |
| 2,689,546 | 9/1954 | Petri | 119/27 X |

Primary Examiner—Hugh R. Chamblee
Attorney—Cyrus S. Hapgood

[57] ABSTRACT

A barrier is mounted at one end for pivotal movement about a generally horizontal axis parallel to the length of the enclosure and can be swung on this axis between a closed position, wherein the barrier extends transversely across the enclosure, and an open position where it is clear of the enclosure. A rod extending parallel to the length of the enclosure is journalled for rotation about its own axis and is coupled to the barrier, the rod being rotatable to open and close the barrier by means of an arm secured to the rod and extending radially therefrom at a point spaced along the rod from the barrier.

4 Claims, 4 Drawing Figures

PATENTED JUL 3 1973 3,742,910

GATE FOR ANIMAL ENCLOSURE

The present invention relates to an improved gate or barrier for controlling the exit of cattle from an enclosure such as a stall of a milking parlor.

In modern milking parlors, one man can feed and milk a large number of cows in the shortest possible time because of highly automated feeding and milking machinery. In a typical milking parlor, an elongated central working area or pit is situated between two relatively elevated, parallel stalls each having an entry gate for cattle at one end of the parlor and an exit gate at the other end. Due to the oblique disposition of these gates relative to the longitudinal direction of the respective stalls, the position on the longitudinal side of each stall remote from the working area of a series of mangers, and the transverse width of each stall (the latter being less than the space occupied by a cow standing perpendicularly with respect to the length of the stall), the first cow admitted through the entry gate of each stall passes down the length of the stall under pressure from those behind it and adopts a position where it can feed from the manger adjacent the closed exit gate. It is thus forced into a position roughly parallel with the exit gate, succeeding cows adopting similar attitudes in order to feed from the successive mangers, so that the cows in each stall stand obliquely relative to the longitudinal direction of the stall. This, combined with the elevation of each stall above the working area, gives a man standing in the latter optimum access to the udders of the cows, between a low hoof ledge upstanding from the longitudinal edge of each stall adjacent the working area and a horizontal rump rail which is fixed at a suitable height above and parallel with the hoof ledge. Normally the oblique disposition of the cows in the two stalls is opposite this being known as the "herringbone" arrangement.

As the animals feed, the operator passes down the length of the working area attaching milking apparatus to the cows in both stalls in sequence. Thus, feeding and milking proceed simultaneously; and as soon as the last cow has been milked, the operator opens the exit gate of the stalls to allow the fed cows to leave and also opens, at approximately the same time, the entry gates to admit a fresh batch of cows to each stall.

It will be apparent that conventional exit gates hinged to swing about a vertical axis at one side of the exit end of each stall are inconvenient in this high-speed procedure since there is an insufficient interval, between the last cow leaving each stall and the first cow of a fresh batch entering the stall, to permit such a gate to swing from the open to the closed position without obstruction, so that either a milked cow may be jammed in the exit or an unmilked cow may pass straight through the stall. There is the additional difficulty that the operator is normally at the end of the working area remote from the exit gates when he wishes to operate them practically simultaneously with the entry gates. He is thus in the worst possible position to prevent such obstruction of the exit gates, unless he loses time and slows down the whole operation by traversing the length of the working area in both directions between the admission of successive batches of cows.

There are thus two primary desiderata for the exit gates, namely: (a) that they should move vertically rather than horizontally to minimize the danger of obstruction, and (b) that they should be remotely controllable from a position adjacent the entry gates. Various proposals have been made for fulfilling either or both of these requirements but none has been entirely satisfactory from the point of view of reliability or cost of installation.

The principal object of the present invention is to provide an arrangement which can meet both of these requirements in a simple way and which, while cheap to install, will be wholly reliable in operation.

In accordance with the invention there is provided a gate for a cattle enclosure, such as a milking stall, comprising a barrier member mounted on one end for pivotal movement about a generally horizontal axis parallel to the length of the enclosure, whereby the barrier can be swung between a closed position, in which the barrier extends transversely across the enclosure, and an open position clear of the enclosure. A rod extending parallel to the length of the enclosure is journalled for rotation about its own axis and operatively coupled to the barrier, and an operating arm is secured to the rod for rotating the rod to open and close the barrier, the arm extending radially of the rod at a point spaced along the rod from the barrier member.

When applied to the stalls of a "herringbone" milking parlor as described above, the plane of each gate or barrier member will be oblique with respect to the axis of the associated rod, the latter being preferably supported by bearing sleeves secured at intervals along the length of the rump rail of the stall controlled by the gate or barrier member. This means that during opening and closing movement, each gate or barrier member will move not in the vertical plane in which it is disposed when closed but over part of the surface of a cone having its apex at the unction of the member and associated rod and coaxial with the latter. This deviation, however, is of no practical importance, as the gate member need travel only through approximately 90° from an upright, open position to a horizontal, closed position while moving over the rump of the cow last to leave the stall.

Thus in a milking parlor having two stalls separated by a working area, the side of each stall on which the exit gate is pivotally mounted is the side adjacent the working area. This permits the operation of each gate by a simple rod parallel with the rump rail and avoids the necessity for a complicated transmission apparatus. The arm on each rod is, of course, located within easy reach of the operator when at the position he will be occupying when the exit gates are to be operated, usually near the entry gates and opposite the arm on the other rod so that both arms can be grasped and turned simultaneously if desired. The position of an arm on the associated rod need not be fixed but its position may be adjustable along the length of the rod, or more than one arm may be provided on the same rod at intervals along its length.

One form of milking stall exit gate in accordance with the invention will now be described by way of example, with reference to the accompanying drawings, in which.

Figure 1:
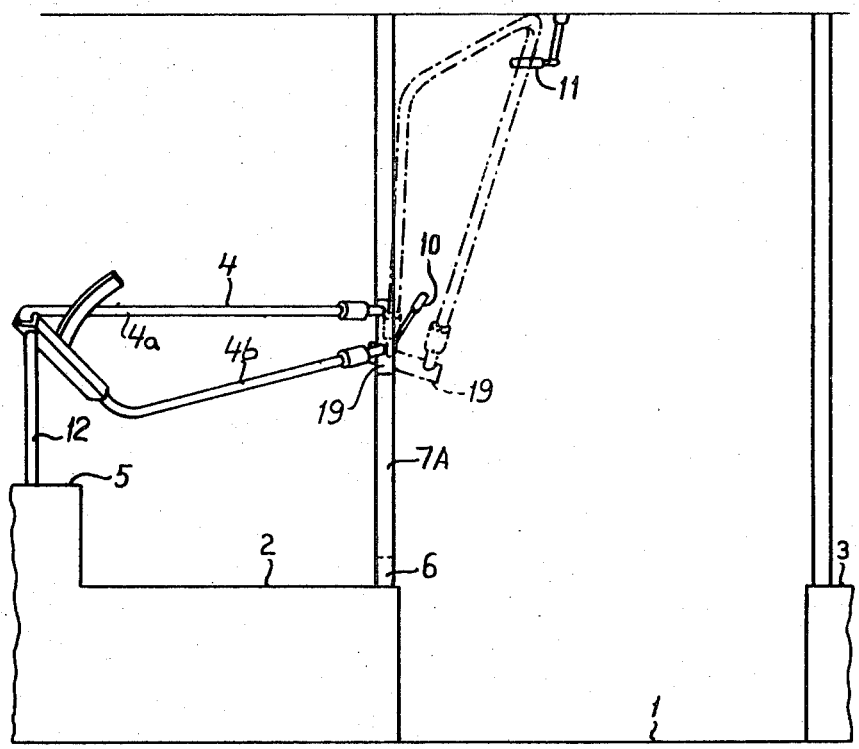
FIG. 1 is a somewhat diagrammatic end view of a milking parlor showing one gate in accordance with the invention.

The milking parlor is of the form generally described above, having a working area or pit 1 between elevated stalls 2 and 3, each provided with an exit gate 4 (only one of which is shown in the drawings) and feeding mangers 5. The longitudinal side of each stall adjacent the pit 1 is bounded by a low hoof ledge 6 and an udder rail 7 supported at intervals by uprights 7A.

Figure 4:
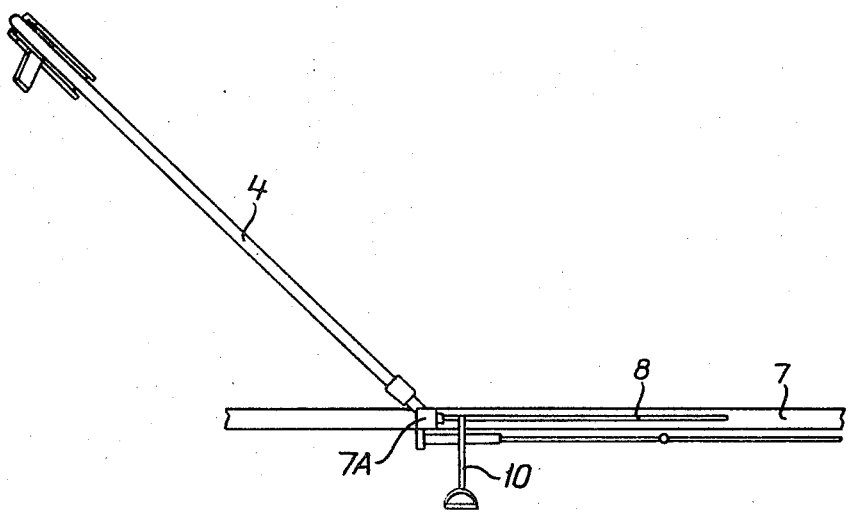
FIG. 4 is a plan view of the gate in closed position.

In this particular installation, the exit gate or barrier 4 is mounted on a convenient upright 7A. The barrier comprises an open frame, conveniently of tubular metal without sharp corners or edges, having a generally horizontal top member 4a, and a lower member 4b which, over the major part of its length, is inclined upwardly toward the top member at the pivoted end of the barrier, adjacent upright 7A. As clearly seen in FIG. 4, the barrier 4 extends obliquely of the stall, at an angle of about 135°. The end of the barrier adjacent the upright 7A is pivotally mounted on the upright for movement about a horizontal axis parallel to the rump rail 7, and the barrier 4 can thus be swung between the closed position shown in FIG. 1 and a raised, open position clear of the stall, shown in broken lines in FIG. 1. Opening and closing movements are affected by means of a rod 8 parallel to the rail 7 and journalled at intervals along its length in bearings (not shown) and in a sleeve 18 through the upright 7A. Rotation of the rod 8 is facilitated by a radially projecting operating arm 10 spaced from the barrier 4 along the rod 8. The position of the arm 10 along the rod may be adjustable, or the rod may be provided with a number of such arms spaced apart along the rod.

In the illustrated example, the pivotal mount for the barrier 4 comprises a plate-like link 19 to which adjacent ends of the upper and lower barrier members 4a and 4b are secured. The link 19 in turn is secured to the end of rod 8 where the latter projects through the upright 7A, this rod being aligned approximately with that part of the link to which the lower barrier member 4b is secured. Thus, as shown in FIG. 1, rotation of rod 8 causes the link 19 to swing from its full-line or vertical position to its broken-line position in moving the barrier from its closed position to its open position.

The free end of the barrier 4 is supported in the closed position by a rest 12, and a bifurcated spring clip 11 is provided to receive and latch the barrier in the raised, open position.

Figure 2:
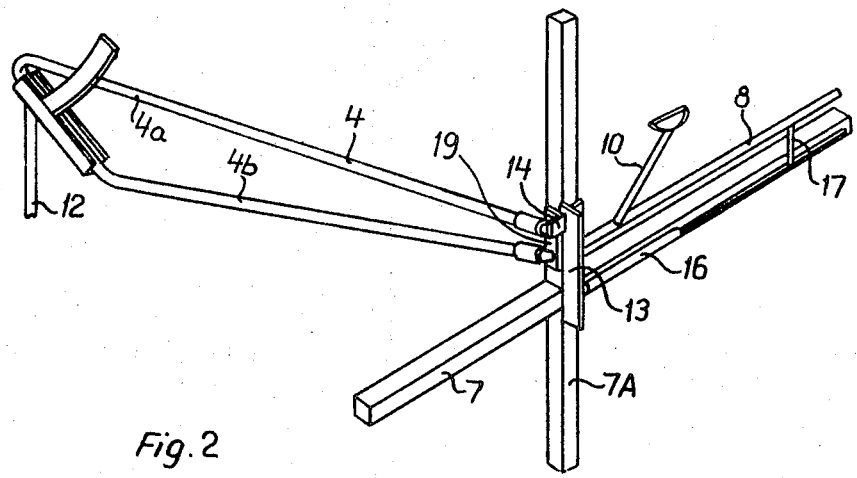
FIG. 2 is an isometric view on a larger scale of the gate shown in FIG. 1.
Figure 3:
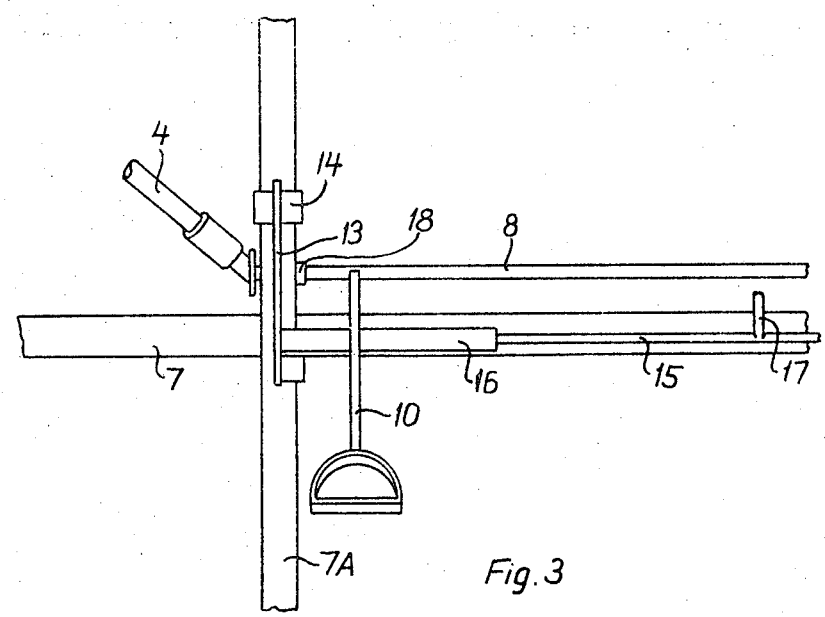
FIG. 3 is a partial side view of the gate in open position.

Preferably, and as shown, the barrier member is locked in the closed position by a manually movable locking member. In the illustrated arrangement, the locking member comprises a plate 13 having a laterally projecting ear 14 normally positioned to obstruct the barrier 4 by blocking the above-mentioned swinging of link 19 from its vertical position, as shown in FIG. 1. The plate is movable to an unblocking position (to the right as viewed in FIG. 3) by an operating bar 15 fixed at its left hand end to the plate and guided in a number of spaced mounting tubes, of which one is shown at 16 in FIG. 2. The bar 15 has one or more handles 17 secured to it at a convenient point or points along its length to facilitate axial shifting of the bar and locking plate by the user.

Although the arrangement of the invention has been described as applied to the stalls of a "herringbone" milking parlor, it is equally suitable for stalls in which the cattle stand at right-angles to the working area, in which case the gate or barrier member will be perpendicular to the associated rod and move in a vertical plane.

Similarly, the invention is not limited in its application to the stalls of milking parlors but is of equal utility in remotely controlling an end of any elongated enclosure for cattle.

I claim:

1. A gate for an animal enclosure, such as a milking stall, comprising a barrier, means mounting said barrier for pivotal movement about a generally horizontal axis parallel to the length of the enclosure, the barrier being pivotable on said mounting means between a closed position, in which the barrier extends transversely across the enclosure, and an open position clear of the enclosure, a rod extending parallel to the length of the enclosure and journalled for rotation about its own axis, the rod being operatively coupled to the barrier, and an operating arm secured to the rod for rotating the rod to open and close the barrier, the arm extending radially of the rod at a point spaced along the rod from the barrier.

2. A gate according to claim 1, wherein the barrier extends at an oblique angle, viewed in plan, to said rod.

3. A gate according to claim 1, wherein the barrier has the form of an open frame which in the closed position is disposed in a vertical plane, aid frame reducing in vertical depth to a minimum depth at its pivoted end.

4. A gate according to claim 3, wherein the barrier frame, as viewed in the closed position, comprises a generally horizontal top frame member and a lower frame member which, over the major part of its length, extends upwardly toward the top frame member in the direction of the pivoted end of the barrier.

* * * * *